US012719096B2

(12) United States Patent
Kang et al.

(10) Patent No.: US 12,719,096 B2
(45) Date of Patent: Aug. 25, 2026

(54) BATTERY CELL THERMAL RUNAWAY SIMULATION TEST METHOD

(71) Applicant: FCA US LLC, Auburn Hills, MI (US)

(72) Inventors: Junxia Kang, Shanghai (CN); Jinkui Yang, Shanghai (CN)

(73) Assignee: FCA US LLC, Auburn Hills, MI (US)

(*) Notice: Subject to any disclaimer, the term of this patent is extended or adjusted under 35 U.S.C. 154(b) by 289 days.

(21) Appl. No.: 18/646,209

(22) Filed: Apr. 25, 2024

(65) Prior Publication Data

US 2025/0337026 A1 Oct. 30, 2025

(51) Int. Cl.
*H01M 10/42* (2006.01)
*G01M 99/00* (2011.01)

(52) U.S. Cl.
CPC ..... *H01M 10/4285* (2013.01); *G01M 99/002* (2013.01)

(58) Field of Classification Search
CPC ........................ H01M 10/4285; G01M 99/002
USPC ............................................... 374/8, 57, 141
See application file for complete search history.

(56) References Cited

U.S. PATENT DOCUMENTS

2022/0045371 A1* 2/2022 Kang .................. H01M 10/482

FOREIGN PATENT DOCUMENTS

| | | | | |
|---|---|---|---|---|
| CN | 209656091 U | * 11/2019 | | |
| CN | 110957545 B | 5/2021 | | |
| CN | 216285620 U | * 4/2022 | | |
| CN | 112216891 B | 1/2023 | | |
| CN | 117233604 A | * 12/2023 | | |
| CN | 118275304 A | * 7/2024 | ............ | G01M 10/00 |
| CN | 120233256 A | * 7/2025 | ............ | G01N 30/02 |
| CN | 223333135 U | * 9/2025 | | |
| KR | 102518856 B1 | * 4/2023 | ........ | H01M 10/4285 |

* cited by examiner

*Primary Examiner* — Mirellys Jagan
(74) *Attorney, Agent, or Firm* — Jeremy J. Klobucar

(57) ABSTRACT

A battery cell thermal runaway simulation system that includes a protective chamber and an adjustment assembly positioned in the protective chamber that is configured to support a test object that will be exposed to a battery cell undergoing a thermal runaway event, wherein the adjustment assembly is movable to adjust a distance between the test object and the battery cell. The system also includes a first thermal monitoring device that is configured to generate a signal indicative of a temperature of gases emitted by the battery cell undergoing the thermal runaway event, a second thermal monitoring device that is configured to generate a signal indicative of a temperature of the test object when the test object is being exposed to the battery cell undergoing the thermal runaway event, and a heating device configured to heat the battery cell until the battery cell reaches a critical temperature and undergoes thermal runaway.

18 Claims, 4 Drawing Sheets

BATTERY CELL THERMAL RUNAWAY SIMULATION TEST METHOD

FIELD

The present disclosure relates to a battery cell thermal runaway simulation tests method.

BACKGROUND

This section provides background information related to the present disclosure which is not necessarily prior art.

Vehicles with electric propulsion systems are becoming increasingly more common. Some electrically propelled vehicles include an electric drive motor at each wheel of the vehicle, and some electrically propelled vehicles include a front electric drive motor for rotating the front wheels of the vehicle and a rear electric drive motor for rotating the rear wheels of the vehicle. In either case, the electric drive motors receive power from a battery pack that includes a plurality of battery cells therein. Example battery cells include lithium-ion battery cells and lithium-metal battery cells.

Lithium-ion and lithium-metal battery cells sometimes undergo a process called thermal runaway during failure conditions. Thermal runaway may result in a rapid increase of battery cell temperature accompanied by the release of various gases, which in some cases may be flammable. These flammable gases may be ignited by the high temperature of the battery, which may result in a fire. While research is being conducted on materials that are best suited (i.e., more thermally resistant) for use in a battery cell that may undergo thermal runaway, no global or industrial standards currently exist that may be followed when conducting simulations of thermal runaway events to evaluate these materials.

SUMMARY

This section provides a general summary of the disclosure, and is not a comprehensive disclosure of its full scope or all of its features.

According to a first aspect of the present disclosure there is provided a battery cell thermal runaway simulation system including a protective chamber; an adjustment assembly positioned in the protective chamber and configured to support a test object that will be exposed to a battery cell undergoing a thermal runaway event, the adjustment assembly being movable to adjust a distance between the test object and the battery cell; a first thermal monitoring device that is configured to generate a signal indicative of a temperature of gases emitted by the battery cell undergoing the thermal runaway event; a second thermal monitoring device that is configured to generate a signal indicative of a temperature of the test object when the test object is being exposed to the battery cell undergoing the thermal runaway event; and a heating device configured to heat the battery cell until the battery cell reaches a critical temperature and undergoes thermal runaway.

According to the first aspect, the system further includes a control device in communication with and configured to control each of the first thermal monitoring device, the second thermal monitoring device, and the heating device.

According to the first aspect, the protective chamber includes an outlet configured to expel the gases emitted by the battery cell during the thermal runaway event.

According to the first aspect, the system further includes a fan or pump located exterior to the protective chamber at a location proximate the outlet for drawing the gases through the outlet.

According to the first aspect, the outlet includes a filter.

According to the first aspect, the adjustment assembly includes a plurality of adjustable supports, each adjustable support including a leg that telescopically mates with a hollow sleeve.

According to the first aspect, the heating device is a hot plate.

According to the first aspect, each of the first and second thermal monitoring devices is an infrared thermal camera.

According to the first aspect, the test object is a metal blank including a fire-resistant coating.

According to a second aspect of the present disclosure, there is provided a method for testing materials of a battery pack using a battery cell thermal runaway simulation system that includes a protective chamber; an adjustment assembly positioned in the protective chamber and configured to support the materials of the battery pack that will be exposed to a battery cell undergoing a thermal runaway event, the adjustment assembly being movable to adjust a distance between the materials of the battery pack and the battery cell; a first thermal monitoring device that is configured to generate a signal indicative of a temperature of gases emitted by the battery cell undergoing the thermal runaway event; a second thermal monitoring device that is configured to generate a signal indicative of a temperature of the materials of the battery pack when the materials of the battery pack are being exposed to the battery cell undergoing the thermal runaway event; and a heating device configured to heat the battery cell until the battery cell reaches a critical temperature and undergoes thermal runaway, the method comprising: determining a testing distance between the materials of the battery pack and the battery cell that will subject the materials of the battery pack to the worst conditions when being exposed to the gases emitted by the battery cell undergoing the thermal runaway event; fixing the materials of the battery pack to the adjustment assembly; adjusting a distance between the materials of the battery pack and the battery cell to the testing distance by moving the materials of the battery pack, with the adjustment assembly, relative to the battery cell; activating the first and second thermal monitoring devices; and activating the heating device to heat the battery cell to the critical temperature and initiate the thermal runaway event and expose the materials of the battery pack to the gases emitted by the battery cell.

According to the second aspect, the method may further include recording a temperature determined by the first thermal monitoring device of the gases emitted by the battery cell when the material of the battery pack begins to fail.

According to the second aspect, the method may further include recording a temperature determined by the second thermal monitoring device of the material of the battery pack when the material of the battery pack begins to fail.

According to the second aspect, the method may further include determining an amount of time that elapses between initiation of the thermal runaway event and failure of the material of the battery pack.

According to the second aspect, the method may further include evacuating gases from the protective chamber through an outlet of the protective chamber using a fan.

According to the second aspect, the adjustment assembly includes a plurality of adjustable supports, each adjustable support including a leg that telescopically mates with a hollow sleeve.

According to the second aspect, the heating device is a hot plate.

According to the second aspect, each of the first and second thermal monitoring devices is an infrared thermal camera.

According to the second aspect, the materials of the battery pack include a metal blank having a fire-resistant coating applied thereto, and the fire-resistant coating faces the battery cell undergoing thermal runaway.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
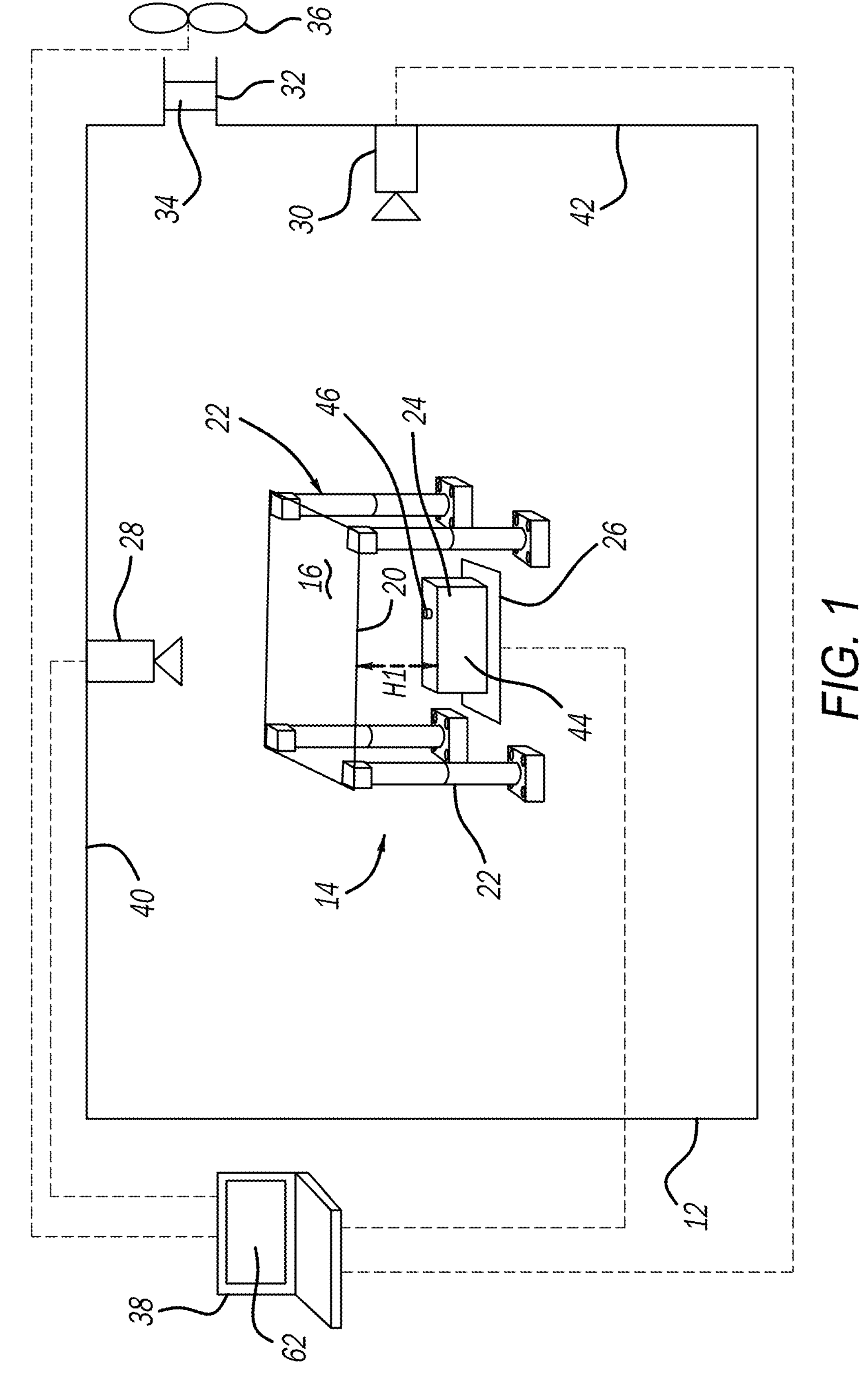
FIG. 1 is a schematic representation of a battery thermal runaway simulation system according to a principle of the present disclosure.

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure is directed to a system and method that can be used to simulate a thermal runaway event where a battery cell fails and emits gases at very high temperatures that can damage various components of a vehicle or other system that utilizes at least one battery cell. Specifically, the present disclosure is directed to a system and method that can be used to simulate a thermal runaway event and evaluate various thermally-resistant materials to determine whether the thermally-resistant materials are satisfactory for use in a battery pack or enclosure that can include at least one of the battery cells.

Figure 2:
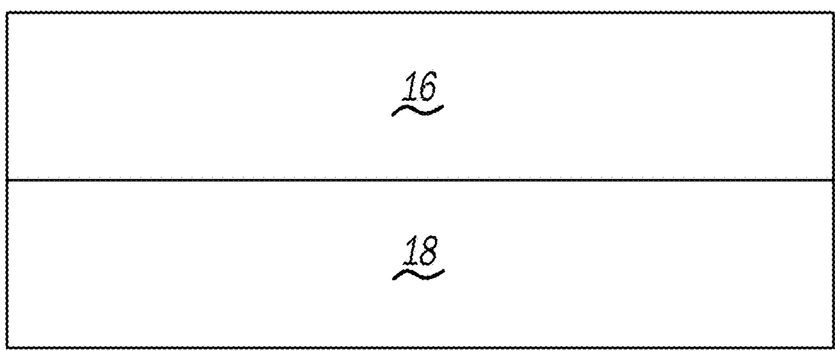
FIG. 2 is a side perspective view of a blank having a fire-resistant coating provided thereon.

Referring to FIG. 1, an example thermal runaway simulation system 10 is illustrated. System 10 includes a protective chamber 12 that houses an adjustment assembly 14 that is configured to support a blank 16 that includes a fire-resistant coating or layer 18 (FIG. 2) on an undersurface 20 thereof. Blank 16 may rest upon or be fixed to (using screws or some other type of fastener—not shown) a plurality of adjustable supports 22 that can adjust a height H1 between the undersurface 20 of blank 16 that includes fire-resistant layer 18 and a battery cell 24 that can be caused to undergo thermal runaway by heating to a critical temperature (i.e., a temperature about 1100 degrees C.) using a heating device or hot plate 26. System also includes thermal monitoring devices 28 and 30 that can be used to measure, for example, a temperature of the emissions that are emitted by battery cell 24 during thermal runaway, as well as a temperature of the blank 16 when exposed to the emissions of the battery cell 24.

Chamber 12 may be formed of a resilient material such as steel, aluminum, concrete, or any other fire-resistant material known to one skilled in the art, and is configured to provide protection to operators of system 10 during use of system 10. Chamber 12 may include a door (not shown) that permits the operator(s) to enter chamber 12 before and after use of system 10 to adjust the height H1 between battery cell 24 and blank 16, install and/or remove battery cell 24 and blank 16 from chamber 12, calibrate thermal monitoring devices 28, 30, and clean an interior of chamber 12 if necessary. To provide proper ventilation of chamber 12, chamber 12 may include an outlet 32 having a filter 34 provided therein to exhaust chamber 12 during and after use of system 10 filter the gases emitted by battery cell 24 that are generated during thermal runaway. To assist in exhausting chamber 12, a fan or pump 36 may be located proximate outlet 32 to draw the exhaust gases generated during thermal runaway out of chamber 12.

Operation of system 10 may be controlled by a control device 38 that may be embodied by a computer or some other type of controller known to one skilled in the art. In this regard, thermal monitoring devices 28 and 30, heating device 26, and fan 36 are each illustrated as being in communication with control device 38 such that each of these elements may be controlled thereby.

Thermal monitoring devices 28 and 30 may be, for example, thermal (e.g., infrared) cameras that are configured to generate signals indicative of temperature. In the illustrated embodiment, one thermal monitoring device 28 may be attached to an upper panel or ceiling 40 of chamber 12 and one thermal monitoring device 30 may be attached to a sidewall 42 of chamber 12. The thermal monitoring device 28 attached to ceiling 40 is configured to monitor a temperature of blank 16 during use of system 10, while thermal monitoring device 30 is configured to monitor a temperature of the gases generated by battery cell 24 during a thermal runaway event. A temperature accuracy of each of the thermal monitoring devices 28 and 30 may be about ±2 degrees C., and each thermal monitoring device 28 and 30 is configured to monitor temperatures in excess of 1600 degrees C.

Battery cell 24 may be any type of battery cell known to one skilled in the art. For example, battery cell 24 may include a lithium-ion and/or lithium-metal active material. It should be understood, however, that other active materials are contemplated. In any event, example gases that may be released during a thermal runaway event include hydrogen ($H_2$), carbon monoxide (CO), carbon dioxide ($CO_2$), and various hydrocarbons including, but not limited to, methane, ethane, ethylene, acetylene, propane, cyclopropane, and butane. Materials such as hydrogen and the above-noted hydrocarbons may be flammable and if ignited during thermal runaway can cause emissions from battery cell 24 during thermal runaway to reach temperatures up to 500 degrees C. or higher. In the illustrated embodiment, battery cell 24 may include a housing 44 having at least one outlet port 46 for releasing any gases generated during thermal runaway. Housing 44 is generally formed of a material similar to that used for blank 16, as will be described below.

Figure 3:
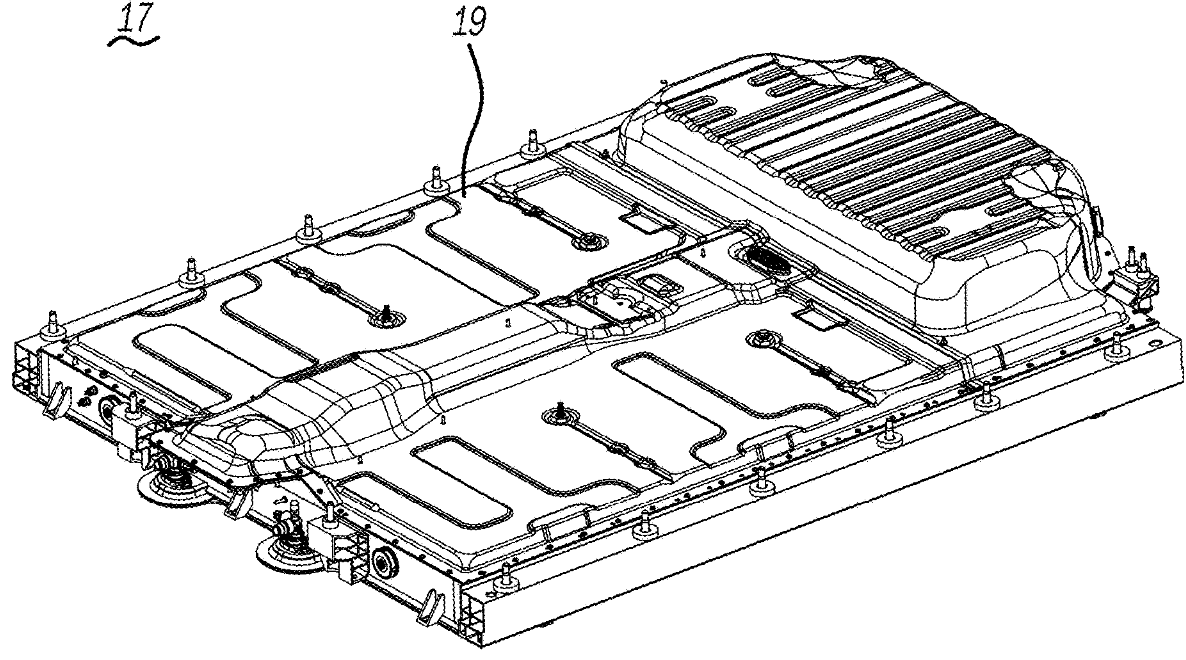
FIG. 3 is a perspective view of an example battery pack.

Blank 16 may be formed of a material that is configured for use in a battery pack 17 (FIG. 3) that will house at least one of the battery cells 24. In this regard, blank 16 may be formed of a rigid, fire- and puncture-resistant material such as steel, aluminum, or some other type of metal (e.g., alloy) material. Alternatively, blank 16 can be formed of a composite material such as, for example, polypropylene or a sheet molding material (SMC) that includes glass strands, mineral fillers, and a liquid thermosetting resin. If corrosion resistance is required for battery pack 17 when used in, for example, a vehicle or some other type of device that can be exposed to moisture, blank 16 may include a corrosion-resistant coating (e.g., E-coat), as is known in the art. While the material selected for use in a battery pack 17 may be formed of a fire-resistant material, it may still be desirable that the battery pack 17 include a fire-resistant coating or layer on an interior or exterior surface thereof. Thus, as noted above, blank 16 is subjected to testing using system 10 while including a layer 18 formed thereon. Layer 18 may be formed of, for example, an epoxy-based or a silicone-based material that is fire-resistant.

As noted above, no global or industrial standards currently exist that may be followed when conducting simulations of thermal runaway events to evaluate the effectiveness of a material selected for layer 18. Accordingly, system 10 has been developed to subject various materials (e.g., epoxy-based and silicone-based materials) that can be used for layer 18 to thermal runaway conditions that are the same as, or at least substantially similar to, the thermal runaway conditions that may be experienced by such a material when placed in a battery pack 17 including at least one of the battery cells 24. While system 10 was developed to evaluate various materials that may be used for layer 18, it should be understood that system 10 may also be used to evaluate other features of a battery pack 17 that may be subjected to a thermal runaway event. Example features include, but are not limited to, different materials for blank 16 that can be used to form housing 19 of the battery pack 17, different thicknesses for blank 16, different corrosion-resistant coatings, and others.

Figure 4:
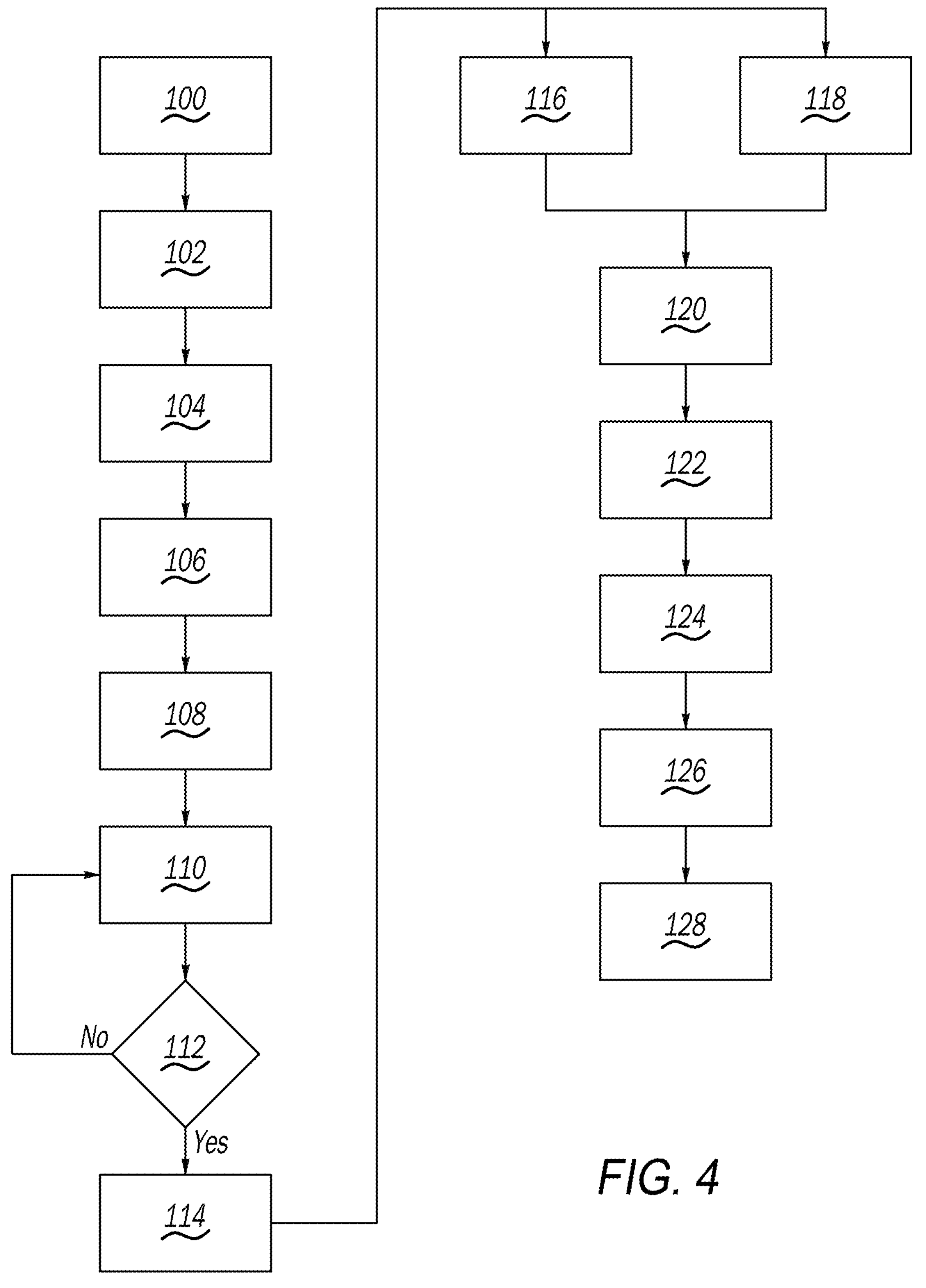
FIG. 4 is a flow chart depicting an example method of conducting a battery thermal runaway simulation according to a principle of the present disclosure.

Once the material has been selected for forming a housing 19 (FIG. 3) of the battery pack 17 that will include at least one battery cell 24, blank 16 is formed from the same material (FIG. 4, step 100). For example, blank 16 may be formed of a material such as steel or aluminum. A thickness of blank 16 should be about the same as that selected for use for the housing 19 of the battery pack 17. An example thickness of blank 16 may be in the range of about 2 mm to about 5 mm. The dimensions of blank 16 used during the simulation are variable, but example lengths and widths of blank 16 may be in a range of about 30 cm to about 50 cm. After blank 16 is formed, a fire-protection coating or layer 18 can be applied to one of the primary surfaces of blank 16 (FIG. 4, step 102) using, for example, an adhesive (not shown). A thickness of the fire-protection layer 18 can range between about 0.5 mm to about 2 mm and is preferably about 1 mm.

After layer 18 has been applied to blank 16, blank 16 having layer 18 may be located upon adjustment assembly 14 in a manner that layer 18 will face battery cell 24 (FIG. 4, step 104). Specifically, blank 16 is placed upon adjustable supports 22. Blank 16 may be fixed to supports 22 using a fastener or clamp (not shown) so that blank 16 remains fixed to the supports 22 throughout the thermal runaway simulation. After blank 16 is fixed to supports 22, the height H1 between layer 18 and battery cell 24 can be adjusted (FIG. 4, step 106). The height H1 may be selected based on the desired distance between a battery cell 24 and the housing 19 of the battery pack 17 that is selected during design of the battery pack 17, and may be, for example, in the range of about 5 mm to about 15 mm. Preferably, the height H1 selected for the simulation provides the worst working condition for layer 18 provided on blank 16.

Figures 5A, 5B:
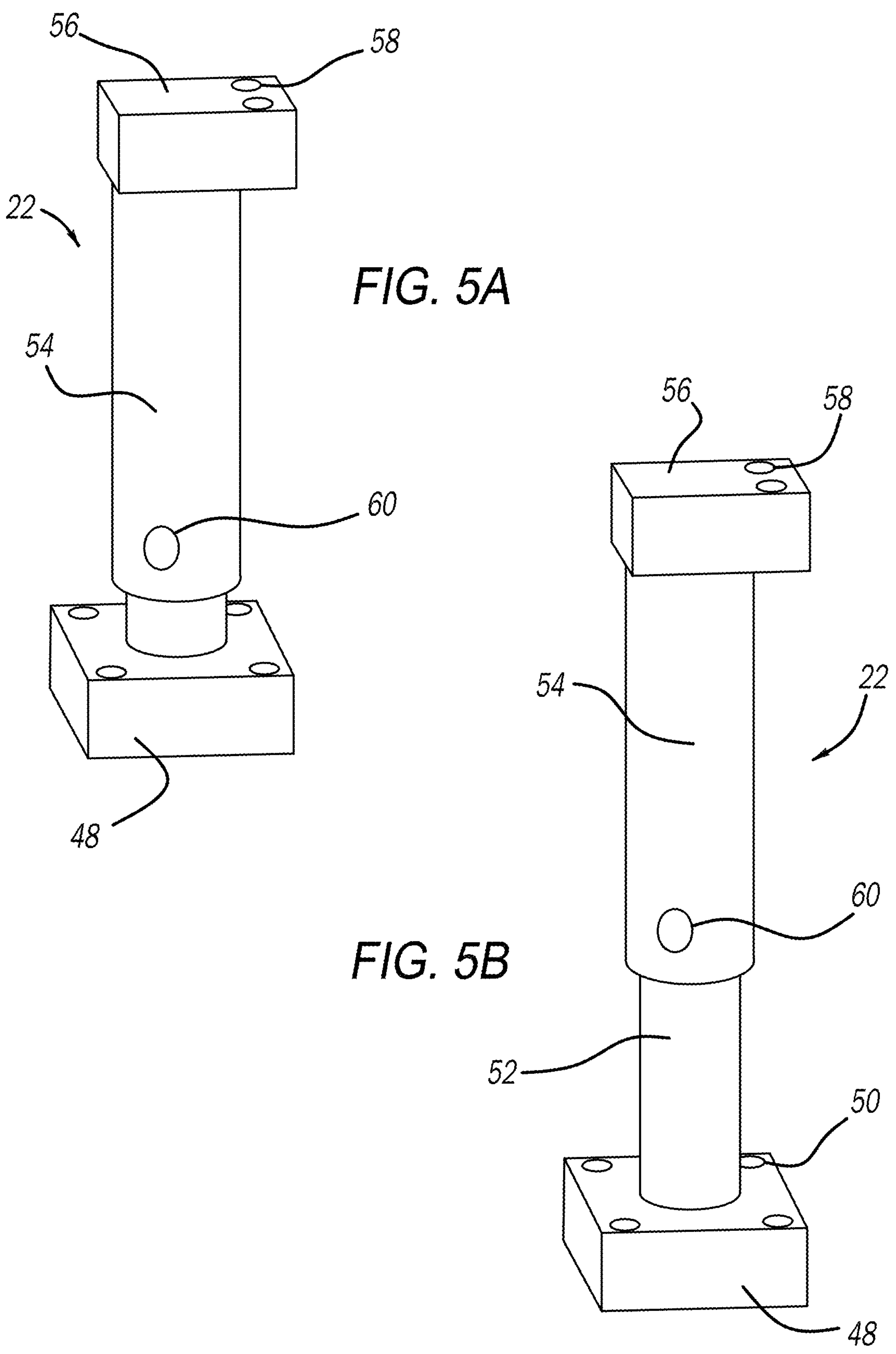
FIGS. 5A and 5B illustrate example adjustable supports that can be used to adjust a distance between a blank and a battery cell in the system illustrated in FIG. 1.

As best shown in FIGS. 5A and 5B, each of the adjustable supports 22 include a base 48 having a plurality of apertures 50 configured for receipt of a fastener (not shown) for fixing the adjustable supports 22 to a floor of the chamber 12. A cylindrical leg 52 extends outward from base 48 that is configured to telescopically mate with a hollow cylindrical sleeve 54 attached to a support arm 56. Support arm 56 includes a plurality of through-holes 58 configured for receipt of a fastener (not shown) that can be used to fix blank thereto. To adjust the height H1, cylindrical sleeve 54 may be moved upward (FIG. 5B) or downward (FIG. 5A) along cylindrical leg 52. To fix sleeve 54 in the desired location that yields the selected height H1, sleeve 54 may include a threaded opening 60 into which a threaded fastener (not shown) may be inserted until it engages with cylindrical leg 52. Adjustable supports 22 may be formed of a rigid and non-flammable material such as a metal material (e.g., steel, aluminum, or other metal materials). A maximum adjustment of amount of sleeve 54 relative to leg 52 is about 20 cm. When leg 52 is fully received within sleeve 54, a length between base 48 and support arm 56 is about 9 cm.

After adjusting the height H1 between layer 18 and battery cell 24, chamber 12 may be sealed and an operator may use control device 38 to operate system 10 (FIG. 4, step 108). In this regard, controller 38 may instruct fan or pump 36 to operate and begin drawing air out of chamber 12, thermal monitoring devices 28 and 30 may be turned on and images generated therewith may be viewed on a monitor 62 of control device 38 (step 110). Once the operator has determined that fan 36 and thermal monitoring devices 28 and 30 are operating correctly (step 112), operator may use control device 38 to operate heating device 26 and begin raising a temperature of battery cell 24 until the battery cell 24 reaches a critical temperature and begins undergoing thermal runaway (step 114).

Once battery cell 24 begins to undergo thermal runaway, gases generated by failure of the materials contained in the battery cell 24 will be emitted from outlet port 46 in a direction toward the layer 18 provided on blank 16. The temperature of the gases/spray emitted from outlet port 46 toward layer 18 can be monitored by thermal monitoring device 30 (step 116). Simultaneously, temperatures at the opposite surface of blank 16 that does not include layer 18 may be monitored by thermal monitoring device 28 (step 118), and recorded if desired. The monitored temperatures can be recorded manually by operator, or automatically recorded by control device 38 (step 120).

Once it has been determined that layer 18 is beginning to fail (i.e., burn), the signals indicative of temperature generated by thermal monitoring devices 28 and 30 and the amount of time that elapsed from the onset of thermal runaway until layer 18 began to fail is recorded (step 122). If layer 18 entirely fails and the hot gases/spray emitted by battery cell 24 begin to cause blank 16 to also fail, the signal indicative of temperature generated by thermal monitoring device 28 and the amount of time that elapsed from the onset of thermal runaway until blank 16 began to fail is recorded (step 124). If blank 16 does not fail, the greatest temperature experienced at the side of the blank 16 that does not include the layer 18 (generated by thermal monitoring device 28) is recorded.

Finally, after the thermal runaway event has ended, fan 36 may continue to run to exhaust chamber 12 (step 126). Once a sufficient amount of time has passed where blank 16 has cooled to be safely inspected, the operator may enter the chamber 12, detach the blank 16 from the adjustment assembly 14, and inspect the blank 16 (step 128). According to the above-described method, different materials can be evaluated for blank 16 and layer 18 in a repeatable and controlled manner. Put another way, the materials for blank 16 and 18 can be exposed to thermal runway conditions that are the same as or at least substantially similar to what would be experienced by a housing 19 of a battery pack 17 that includes at least one of the battery cells 24. Because the conditions are the same as or at least substantially similar to those experienced during an actual thermal runaway event, the system 10 and above-described method provides more accurate data in comparison to a conventional method of testing materials using, for example, an acetylene torch where it is difficult to determine when a material fails and the temperature at which failure occurs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A battery cell thermal runaway simulation system, comprising:

a protective chamber;

an adjustment assembly positioned in the protective chamber and configured to support a test object that will be exposed to a battery cell undergoing a thermal runaway event, the adjustment assembly being movable to adjust a distance between the test object and the battery cell;

a first thermal monitoring device that is configured to generate a signal indicative of a temperature of gases emitted by the battery cell undergoing the thermal runaway event;

a second thermal monitoring device that is configured to generate a signal indicative of a temperature of the test object when the test object is being exposed to the battery cell undergoing the thermal runaway event; and a heating device configured to heat the battery cell until the battery cell reaches a critical temperature and undergoes thermal runaway.

2. The simulation system according to claim 1, further comprising a control device in communication with and configured to control each of the first thermal monitoring device, the second thermal monitoring device, and the heating device.

3. The simulation system according to claim 1, wherein the adjustment assembly includes a plurality of adjustable supports, each adjustable support including a leg that telescopically mates with a hollow sleeve.

4. The simulation system according to claim 1, wherein the heating device is a hot plate.

5. The simulation system according to claim 1, wherein each of the first and second thermal monitoring devices is an infrared thermal camera.

6. The simulation system according to claim 1, wherein the test object is a metal blank including a fire-resistant coating.

7. The simulation system according to claim 1, wherein the protective chamber includes an outlet configured to expel the gases emitted by the battery cell during the thermal runaway event.

8. The simulation system according to claim 7, further comprising a fan or pump located exterior to the protective chamber at a location proximate the outlet for drawing the gases through the outlet.

9. The simulation system according to claim 7, wherein the outlet includes a filter.

10. A method for evaluating materials of a battery pack using a battery cell thermal runaway simulation system that includes a protective chamber; an adjustment assembly positioned in the protective chamber and configured to support the materials of the battery pack that will be exposed to a battery cell undergoing a thermal runaway event, the adjustment assembly being movable to adjust a distance between the materials of the battery pack and the battery cell; a first thermal monitoring device that is configured to generate a signal indicative of a temperature of gases emitted by the battery cell undergoing the thermal runaway event; a second thermal monitoring device that is configured to generate a signal indicative of a temperature of the materials of the battery pack when the materials of the battery pack are being exposed to the battery cell undergoing the thermal runaway event; and a heating device configured to heat the battery cell until the battery cell reaches a critical temperature and undergoes thermal runaway, the method comprising:

determining a testing distance between the materials of the battery pack and the battery cell that will subject the materials of the battery pack to the worst possible conditions when being exposed to the gases emitted by the battery cell undergoing the thermal runaway event;

fixing the materials of the battery pack to the adjustment assembly;

adjusting a distance between the materials of the battery pack and the battery cell to the testing distance by moving the materials of the battery pack, with the adjustment assembly, relative to the battery cell;

activating the first and second thermal monitoring devices; and activating the heating device to heat the battery cell to the critical temperature and initiate the thermal runaway event and expose the materials of the battery pack to the gases emitted by the battery cell.

11. The method according to claim 10, further comprising recording a temperature determined by the first thermal monitoring device of the gases emitted by the battery cell when the material of the battery pack begins to fail.

12. The method according to claim 10, further comprising recording a temperature determined by the second thermal monitoring device of the material of the battery pack when the material of the battery pack begins to fail.

13. The method according to claim 10, further comprising determining an amount of time that elapses between initiation of the thermal runaway event and failure of the material of the battery pack.

14. The method according to claim 10, further comprising evacuating gases from the protective chamber through an outlet of the protective chamber using a fan.

15. The method according to claim 10, wherein the adjustment assembly includes a plurality of adjustable supports, each adjustable support including a leg that telescopically mates with a hollow sleeve.

16. The method according to claim 10, wherein the heating device is a hot plate.

17. The method according to claim 10, wherein each of the first and second thermal monitoring devices is an infrared thermal camera.

18. The method according to claim 10, wherein the materials of the battery pack include a metal blank having a fire-resistant coating applied thereto, and the fire-resistant coating faces the battery cell undergoing thermal runaway.

* * * * *